US012629940B2

(12) United States Patent
Aichi et al.

(10) Patent No.: US 12,629,940 B2
(45) Date of Patent: May 19, 2026

(54) LIQUID EJECTION APPARATUS, AND CONTROL METHOD AND COMPUTER READABLE MEDIUM STORING A PROGRAM FOR CONTROLLING THE SAME

(71) Applicant: CANON KABUSHIKI KAISHA, Tokyo (JP)

(72) Inventors: Akiko Aichi, Tokyo (JP); Keita Ishimi, Kanagawa (JP); Rie Takekoshi, Kanagawa (JP); Akihiro Tomida, Kanagawa (JP); Toshimitsu Danzuka, Tokyo (JP); Takao Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 18/543,852

(22) Filed: Dec. 18, 2023

(65) Prior Publication Data

US 2024/0198680 A1 Jun. 20, 2024

(30) Foreign Application Priority Data

Dec. 20, 2022 (JP) ................................ 2022-203178

(51) Int. Cl.
*B41J 2/165* (2006.01)
*B41J 2/175* (2006.01)

(52) U.S. Cl.
CPC ......... *B41J 2/1652* (2013.01); *B41J 2/17596* (2013.01)

(58) Field of Classification Search
CPC ...... B41J 2/1652; B41J 2/17596; B41J 2/175; B41J 2/18; B41J 29/38
USPC .......................................................... 347/30
See application file for complete search history.

(56) References Cited

U.S. PATENT DOCUMENTS

2006/0244790 A1* 11/2006 Umeda ................ B41J 2/17566 347/84
2012/0007902 A1* 1/2012 Hiratsuka ................ B41J 29/38 347/7
2012/0050421 A1* 3/2012 Hamasaki ............ B41J 2/17509 347/85
2014/0063088 A1* 3/2014 Shibata .................... B41J 2/175 347/6

FOREIGN PATENT DOCUMENTS

JP 2011056840 A 3/2011

* cited by examiner

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A liquid ejection apparatus including: a liquid ejection head having first and second nozzle arrays that eject first and second liquids, respectively; first and second liquid supply channels which supply the first and second liquids inside first and second liquid containing units to the liquid ejection head, respectively; first and second pressurization units which pump the first and second liquids to the liquid ejection head through the first and second liquid supply channels; and a control unit configured, in a case of preparing for detaching the liquid ejection head, to control the first and second pressurization units to stop pumping, respectively, and to control the liquid ejection head to discharge the first and second liquids from the first and second nozzle arrays, respectively, while controlling amounts of the first and second liquids discharged from the first and second nozzle arrays, respectively, in the liquid discharge operation.

17 Claims, 8 Drawing Sheets

| INK TYPE | INK EJECTION NOZZLE ARRAY | NUMBER OF DOTS TO BE EJECTED PER NOZZLE (DOTS) |
|---|---|---|
| BLACK | 9 a | 60000 |
| BLACK | 9 b | 60000 |
| CYAN | 9 c | 50000 |
| LIGHT CYAN | 9 d | 50000 |
| MAGENTA | 9 e | 40000 |
| LIGHT MAGENTA | 9 f | 40000 |
| YELLOW | 9 g | 30000 |
| CLEAR | 9 h | 40000 |

FIG.7

LIQUID EJECTION APPARATUS, AND CONTROL METHOD AND COMPUTER READABLE MEDIUM STORING A PROGRAM FOR CONTROLLING THE SAME

BACKGROUND OF THE DISCLOSURE

Field of the Disclosure

The present disclosure relates to a liquid ejection apparatus, and a control method and a computer readable medium storing a program for controlling the same.

Description of the Related Art

As a liquid ejection apparatus that ejects liquid to a target from a liquid ejection head, an ink-jet printing apparatus (referred to also as "an ink-jet printer") has been known, for example. The ink-jet printer uses ink as liquid. The ink-jet printer has an ink ejection head as the liquid ejection head. The ink-jet printer also has a plurality of ink cartridges as liquid reservoir units that store liquids (referred to also as "liquid cartridges"). The ink-jet printer further has a plurality of ink supply channels as channels that supply the liquids stored in the liquid reservoir units to the liquid ejection head (referred to also as "liquid supply channels"). There is a type of ink-jet printer in which the ink cartridges and the ink ejection head are connected by the ink supply channels. This type of ink-jet printer supplies the inks to the ink ejection head by pumping the inks to the ink ejection head from the ink cartridges with various pumps or the like. A problem with such an ink-jet printer is that the inks will leak out in a case where the pressures from the pumps still remain in the ink supply channels and the ink ejection head when the ink ejection head is detached from the ink supply channels. To address this, Japanese Patent Laid-Open No. 2011-56840 (hereinafter referred to as "Document 1") discloses a technique involving removing residual ink pressures inside ink supply channels and an ink ejection head and then moving the ink ejection head to a position where the ink ejection head can be detached and attached as a preparation for detaching the ink ejection head from the ink-jet printer. The residual ink pressures are removed by stopping air supply into the ink cartridges, stopping pressurization of the inside of the ink cartridges, and sucking the inks out of the ink supply channels and the ink ejection head with a cleaning unit. This can prevent leakage of the inks when a user detaches the ink ejection head.

In Document 1, multiple ink cartridges are illustrated which are arrayed at the same height position in a tank holder. With such a configuration, even in a case where the inks are evenly sucked out of multiple nozzle arrays corresponding to multiple ink tanks with a single suction cap, the inks in the multiple ink supply channels will be in the same state after the suction. Incidentally, in a case where the volumes of the inks are large, the sizes of the ink cartridges will be large, making it difficult to mount these ink cartridges to the main body side by side. There is a color ink-jet printer with multiple large-capacity ink cartridges mounted to its main body so as to be offset from one another in the height direction. In such a color ink-jet printer, due to the difference in height of the ink cartridges, the state of the inks differ between the ink supply channels even before suction. In addition, there is a case where even though there is no difference in height of the ink cartridges, the state of the inks differ between the ink supply channels even before suction. If the state of the inks differ between the ink supply channels even before suction and the suction is executed in such a way that the inks are evenly sucked out of the multiple nozzle arrays corresponding to the multiple ink tanks with a single suction cap, then the state of the ink differs between the ink supply channels after the suction. In a case where the amount of the ink sucked out of an ink supply channel is insufficient, the ink may leak out of that ink supply channel when a user detaches the ink ejection head. In a case where the amount of the ink sucked out of another ink supply channel is excessively large, the ink and air may back up into the ink supply channel from the ink ejection head, which may cause other problems.

SUMMARY OF THE DISCLOSURE

The present disclosure provides a liquid ejection apparatus including: a liquid ejection head having a first nozzle array that ejects first liquid supplied from a first liquid containing unit and a second nozzle array that ejects second liquid supplied from a second liquid containing unit; a first liquid supply channel which supplies the first liquid inside the first liquid containing unit to the liquid ejection head; a second liquid supply channel which supplies the second liquid inside the second liquid containing unit to the liquid ejection head; a first pressurization unit which pumps the first liquid to the liquid ejection head through the first liquid supply channel; a second pressurization unit which pumps the second liquid to the liquid ejection head through the second liquid supply channel; and a control unit configured, in a case of preparing for detaching the liquid ejection head, to control the first pressurization unit and the second pressurization unit to stop pumping the first liquid and the second liquid, respectively, and to control the liquid ejection head to perform a liquid discharge operation of discharging the first liquid and the second liquid from the first nozzle array and the second nozzle array, respectively, while controlling amounts of the first liquid and the second liquid discharged from the first nozzle array and the second nozzle array, respectively, in the liquid discharge operation.

Further features of the present disclosure will become apparent from the following description of exemplary embodiments with reference to the attached drawings.

BRIEF DESCRIPTION OF THE DRAWINGS

FIG. 7 is a table listing amounts of inks to be ejected corresponding to liquid ejection nozzle arrays according to one or more aspects of the present disclosure.

DESCRIPTION OF THE EMBODIMENTS

Embodiments of the present disclosure will be described below with reference to the drawings.

First Embodiment

Figure 1:
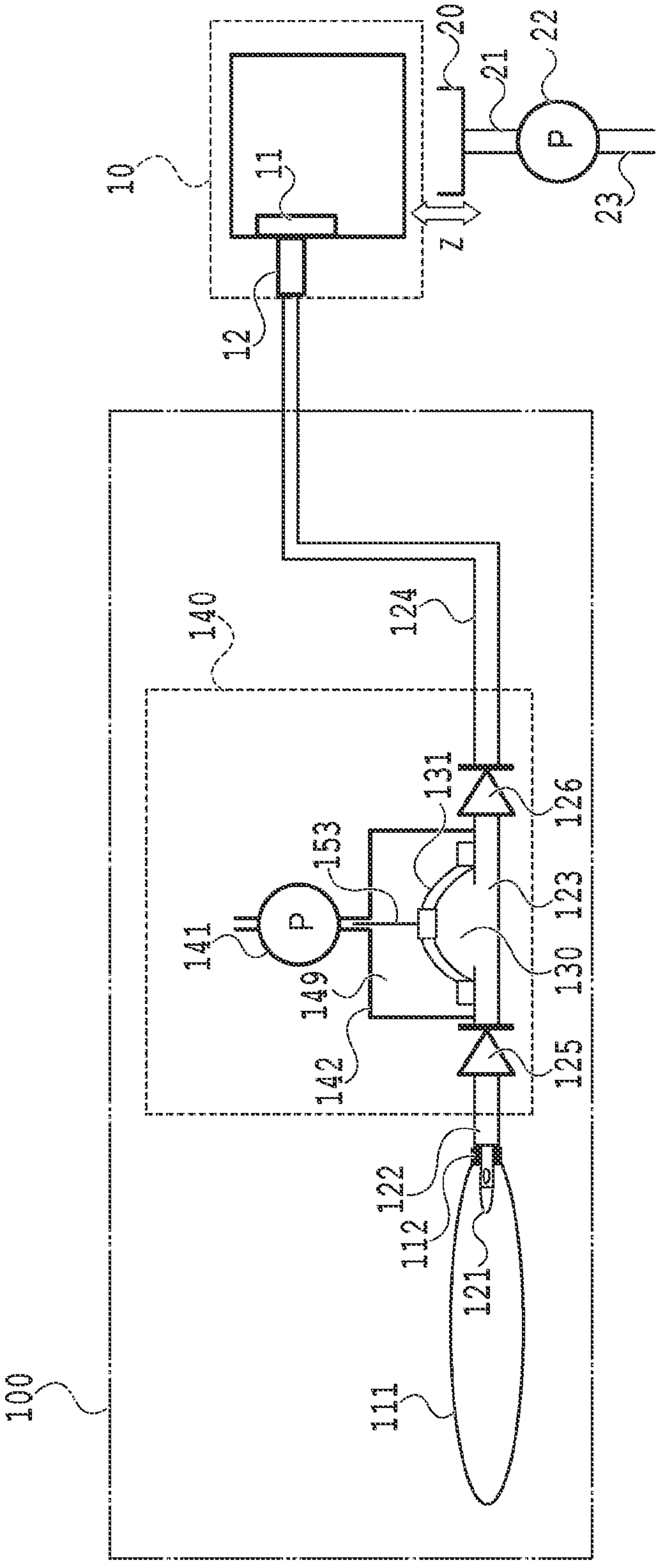
FIG. 1 is a schematic view illustrating an ink supply unit and an ink ejection head according to one or more aspects of the present disclosure.

FIG. 1 illustrates a schematic cross-sectional view of a main part representing an example of a liquid ejection apparatus of the present disclosure and an example of an ink-jet printing apparatus employing the liquid ejection apparatus of the present disclosure. Hereinafter, the example of the ink-jet printing apparatus employing the liquid ejection apparatus of the present disclosure will also be referred to simply as "an ink-jet printer".

Figure 2:
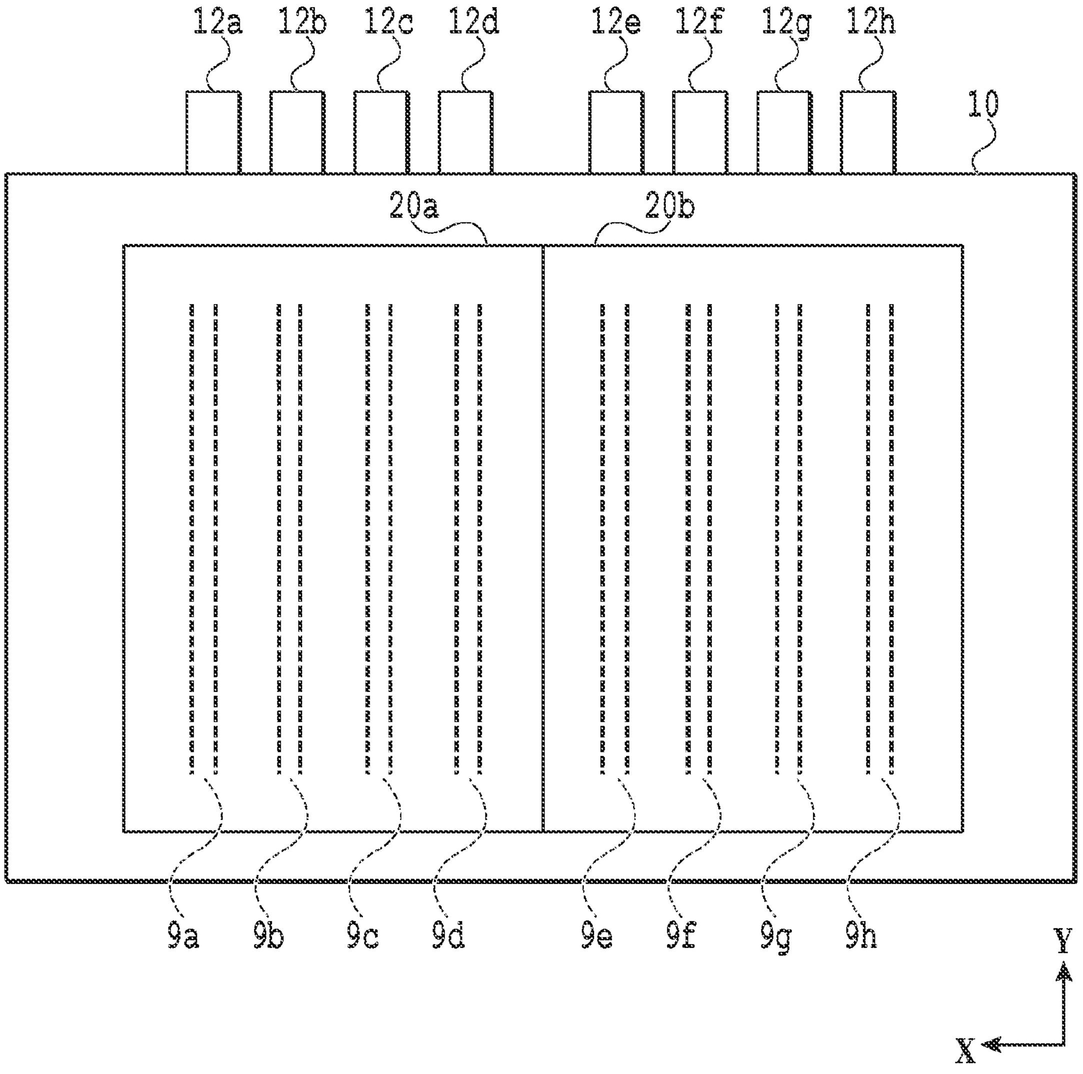
FIG. 2 is a plan view of the ink ejection head according to one or more aspects of the present disclosure as seen from a suction cap side.

In FIG. 1, reference 100 denotes an ink supply unit (referred to also as "a liquid supply unit"). Reference 10 denotes an ink ejection head (referred to also as "a liquid ejection head") to which inks are supplied from the ink supply unit 100. The ink ejection head 10 includes multiple ink ejection nozzle arrays (referred to also as "liquid ejection nozzle arrays") 9*a* to 9*h* as illustrated in FIG. 2. FIG. 1 shows a part related to one of the ink ejection nozzle arrays 9*a* to 9*h*. An image or the like is formed on a print medium, such as a paper sheet, with the inks ejected from the ink ejection nozzle arrays 9*a* to 9*h*. Reference 12 denotes a head joint detachably connected to a third ink supply channel (referred to also as "a liquid supply channel") 124 connected to the ink supply unit 100. Reference 11 denotes a negative pressure regulator provided inside the ink ejection head 10. The negative pressure regulator 11 communicates with the head joint 12, and regulates the pressure of ink, which is supplied from the ink supply unit 100 through the third ink supply channel 124 and the head joint 12, to a predetermined negative pressure. The negative pressure regulator 11 enables that the ink at the predetermined negative pressure is supplied to the corresponding ink ejection nozzle arrays out of the ink ejection nozzle arrays 9*a* to 9*h*.

Reference 20 denotes a suction cap for capping the ink ejection nozzle arrays 9*a* to 9*h* of the ink ejection head 10. As illustrated in FIG. 2, the suction cap 20 is divided into two parts 20*a* and 20*b*, for example. The suction cap 20 is configured to be capable of reciprocally moving in the direction of a double-headed arrow Z in FIG. 1 between a capping position and a separated position by means of a known attachment/detachment mechanism (not illustrated). FIG. 1 illustrates a case where the suction cap 20 is located at the separated position. A suction pump 22 is connected to the suction cap 20 through a suction cap tube 21. The suction cap 20 is configured to be capable of sucking the inks out of the ink ejection nozzle arrays 9*a* to 9*h* by driving the suction pump 22. The suction cap 20 is capable of receiving the inks ejected from the ink ejection head 10. By ejecting the inks from the ink ejection head 10 into the suction cap 20 while no printing operation is performed, the ink ejection head 10 can be maintained in a good condition. The inks discharged from the ink ejection head 10 by suction by the suction cap 20 and the inks discharged from the ink ejection head 10 by an ejection operation of the ink ejection head 10 at the capping position flow into the suction cap 20. The inks having flowed into the suction cap 20 are sent to a maintenance cartridge (not illustrated) through the suction cap tube 21, the suction pump 22, and a waste ink tube (referred to also as "a waste liquid tube") 23 and will be contained and held in the maintenance cartridge.

FIG. 2 is a plan view of the ink ejection head 10 as seen from the suction cap 20 side. The multiple ink ejection nozzle arrays 9*a* to 9*h* are arrayed in the ink ejection head 10. In each ink ejection nozzle array, 4096 ink ejection nozzles are arrayed. The amount of a liquid droplet to be ejected from a single ink ejection nozzle is 5.0 [pl].

The ink ejection head 10 includes eight head joints 12*a* to 12*h* and eight negative pressure regulators 11 corresponding to the eight ink ejection nozzle arrays 9*a* to 9*h*. Moreover, as will be described later, the ink supply unit 100 includes eight pressurization units 140. Each pressurization unit 140 draws in the ink from a corresponding ink cartridge (referred to also as "a liquid reservoir unit") 111 and then pressurizes the ink, and the pressurized ink is supplied to the corresponding head joint 12 through the corresponding third ink supply channel 124.

The sides of the two rectangles indicated by references 20*a* and 20*b* in FIG. 2 represent lines where the two suction caps 20*a* and 20*b* come into contact with the ink ejection head 10 in a case of being raised and set to the capping position. The two suction caps 20*a* and 20*b* are capable of performing suction operations simultaneously and also individually. The suction cap 20*a* caps the ink ejection nozzle arrays 9*a* to 9*d*, and the suction cap 20*b* caps the ink ejection nozzle arrays 9*e* to 9*f*. Thus, in a case of performing a suction operation using the suction cap 20*a*, the ink ejection nozzle arrays 9*a* to 9*d* are simultaneously subjected to the suction. In a case of performing a suction operation using the suction cap 20*b*, the ink ejection nozzle arrays 9*e* to 9*f* are simultaneously subjected to the suction.

Referring back to FIG. 1, the ink supply unit 100 will be described.

In the ink supply unit 100, reference 111 denotes an ink cartridge configured to be detachably mountable to an ink cartridge station 13 (see FIG. 3) included in the ink-jet printer. The ink cartridge 111 is a bag-shaped object containing liquid such as ink inside. The ink cartridge 111 includes a rubber stopper 112. The ink cartridge 111 is configured such that a hollow ink supply needle (referred to also as "a liquid supply needle") 121 penetrates through this rubber stopper 112 in a case where the ink cartridge 111 is mounted to the ink cartridge station 13. With the ink supply needle 121 penetrating through the rubber stopper 112, the ink inside the ink cartridge 111 can flow into a first ink supply channel 122. The ink cartridge 111 has a part using a flexible material, and its inner volume is variable. FIG. 1 illustrates a state where a maximum amount of the ink is contained in the ink cartridge 111 (i.e., a state where a new ink cartridge 111 is mounted to the ink cartridge station 13). In the ink supply unit 100 in the first embodiment, a new ink cartridge 111 contains approximately 1,000 ml of the ink.

In FIG. 1, reference 140 denotes a pressurization unit. The pressurization unit 140 has a mechanism for pumping the ink inside the ink cartridge 111 to the ink ejection head 10. In the present embodiment, eight ink cartridges are mounted to the ink cartridge station 13, and a pressurization unit 140 is provided for each individual ink cartridge 111. Each pressurization unit 140 is installed at the same height position as the corresponding ink cartridge 111.

The pressurization units 140 will be described in more detail. Reference 123 denotes a second ink supply channel communicating with the first ink supply channel 122 through a check valve 125. Reference 130 denotes an internal ink chamber (referred to also as "a liquid chamber") provided inside the pressurization unit 140. The internal ink chamber 130 communicates with the second ink supply channel 123. A part 131 of the internal ink chamber 130 is made of a flexible material, such as rubber, and the inner volume of the internal ink chamber 130 is variable. Hereinafter, the part 131 of the internal ink chamber 130 will also be referred to as "a flexible part 131". FIG. 1 illustrates a state where the inner volume of the internal ink chamber 130 is at the maximum. The maximum inner volume of the internal ink chamber 130 in the ink supply unit 100 in the present embodiment is 1.5 ml. Incidentally, a stopper or the like (not illustrated) is provided to prevent the inner volume of the internal ink chamber 130 from exceeding the maximum inner volume.

A draw pump 141 is provided outside the internal ink chamber 130. A partition 142 and other components are provided such that the air in a space 149 outside the internal ink chamber 130 can be sucked and discharged by driving the draw pump 141. Hereinafter the space 149 outside the internal ink chamber 130 will also be referred to as "an ink chamber outside space" or "a liquid chamber outside space". A passage communicating with the draw pump 141 is provided at the top of the partition 142, and a needle 153 is inserted into this passage. The needle 153 is fixed at the top of the flexible part 131. The needle 153 has such a length as to be always inserted in the passage, and functions to prevent the internal ink chamber 130 from deforming unevenly in a case where the volume of the internal ink chamber 130 reaches the minimum.

As the air inside the ink chamber outside space 149 gets sucked and discharged, the pressure inside the ink chamber outside space 149 becomes a negative pressure. That negative pressure acts so as to pull the flexible part 131, thereby expanding the inner volume of the internal ink chamber 130. As a result, the ink inside the ink cartridge 111 flows into the internal ink chamber 130 through the first ink supply channel 122 and the second ink supply channel 123 until the inner volume of the internal ink chamber 130 reaches the maximum. Note that the check valve 125 is provided between the first ink supply channel 122 and the second ink supply channel 123, as mentioned earlier. The check valve 125 operates so as to allow the ink inside the first ink supply channel 122 to flow into the second ink supply channel 123 but not to allow the ink inside the second ink supply channel 123 to flow into the first ink supply channel 122.

Reference 124 denotes the third ink supply channel through which the second ink supply channel 123 and the negative pressure regulator 11 communicate with each other. A check valve 126 is provided between the second ink supply channel 123 and the third ink supply channel 124. The check valve 126 operates so as to allow the ink inside the second ink supply channel 123 to flow into the third ink supply channel 124 but not to allow the ink inside the third ink supply channel 124 to flow into the second ink supply channel 123.

Thus, as the inner volume of the internal ink chamber 130 expands, the ink inside the ink cartridge 111 flows into the internal ink chamber 130. The expansion of the inner volume of the internal ink chamber 130 does not let the ink inside the third ink supply channel 124 flow into the internal ink chamber 130. In the present embodiment, the pressurization unit 140 spends 3 seconds to expand the internal ink chamber 130 to the maximum inner volume, and then causes the ink chamber outside space 149 to communicate with the atmosphere. As a result, the internal ink chamber 130, which is made of a flexible material, collapses and the inner volume becomes the minimum. The inner volume of the internal ink chamber 130 at the point when the inner volume has shrunk to the minimum is 0.5 ml. As the internal ink chamber 130 shrinks, the ink held inside of the internal ink chamber 130 flows into the third ink supply channel 124. The ink-jet printer performs such an operation of expending the internal ink chamber 130 at intervals of 7 seconds during a printing operation. In this way, the ink is sent to the ink ejection head 10 in a pressurized state. In the present embodiment, the total inner volume of the first ink supply channel 122, the second ink supply channel 123, the third ink supply channel 124, and a part from the head joint 12 to the negative pressure regulator 11 of the ink ejection head 10 is 40.0 ml. Hereinafter, an operation of expanding and shrinking the internal ink chamber 130 will also be referred to as "a pressurizing operation of the pressurization unit 140".

The above describes the ink supply from one ink cartridge 111 to the ink ejection head 10. However, the ink-jet printer in the present embodiment has eight ink cartridges 111*a* to 111*h*. The ink-jet printer in the present embodiment includes pressurization units 140 and sets of ink supply channels 122, 123, and 124 corresponding to each of the eight ink cartridges 111*a* to 111*h*. The inks discharged from the eight pressurization units 140 into the eight ink supply channels 124 are supplied to the eight head joints 12*a* to 12*h* provided to the ink ejection head 10, which is shared by these members.

Figure 3:
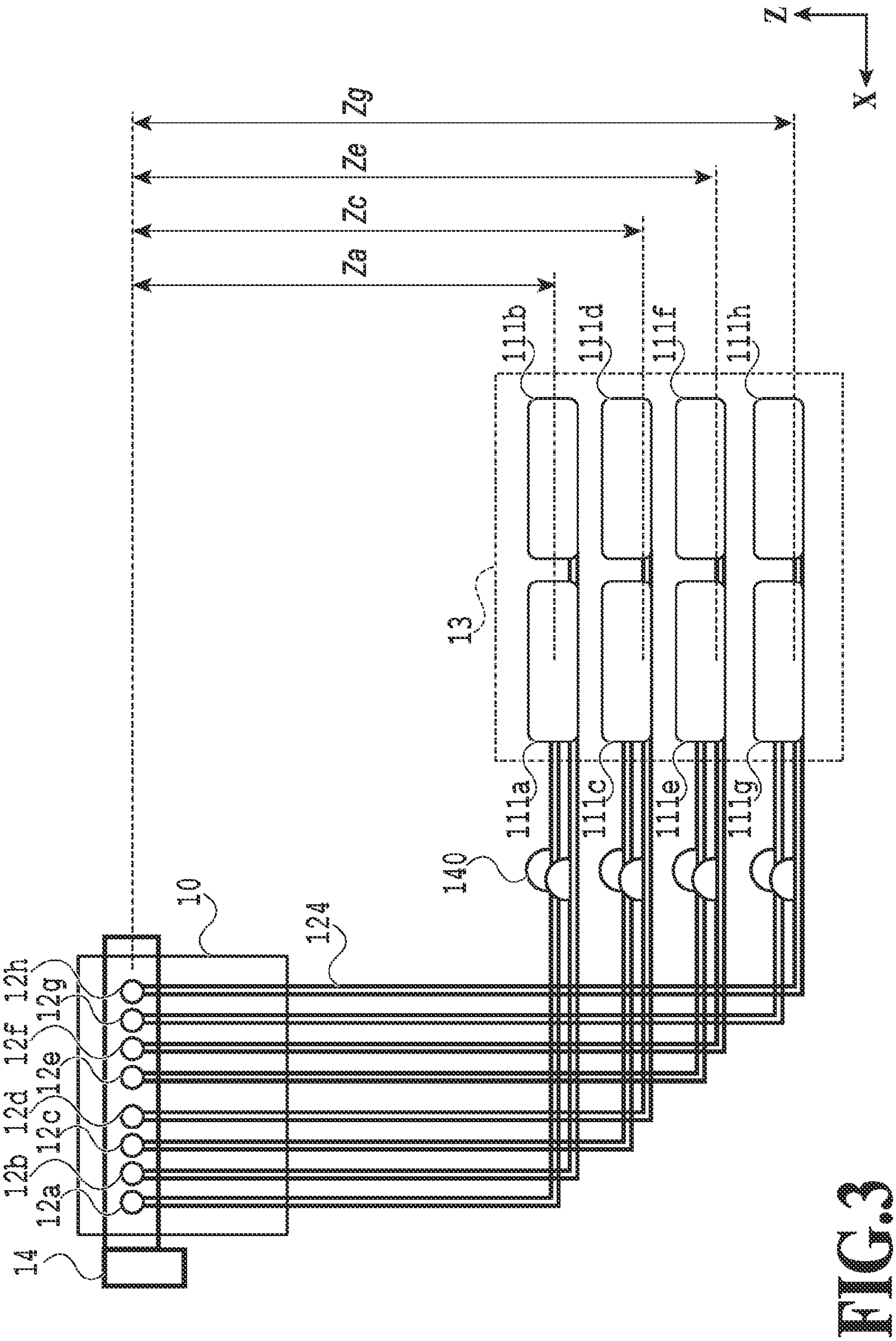
FIG. 3 is a schematic view illustrating relationships between ink cartridges and ink ejection heads in terms of height according to one or more aspects of the present disclosure.

FIG. 3 illustrates positional relationships in a case where the ink cartridges 111*a* to 111*h* and the ink ejection head 10 are mounted to the ink-jet printer in the present embodiment. The eight ink cartridges 111*a* to 111*h* are grouped into four pairs, and the four pairs are mounted at four different heights, respectively. A unit 13 to which the multiple ink cartridges 111*a* to 111*h* can be mounted as above will be referred to as "an ink cartridge station" or as "a liquid cartridge station".

In the present embodiment, the ink cartridges 111*a* and 111*b* are disposed at a position lower by Za=40 cm than the head joints 12 of the ink ejection head 10. The ink cartridges 111*c* and 111*d* are disposed at a position lower by Zc=50 cm than the head joints 12 of the ink ejection head 10. The ink cartridges 111*e* and 111*f* are disposed at a position lower by Ze=60 cm than the head joints 12 of the ink ejection head 10. The ink cartridges 111g and 111*h* are disposed at a position lower by Zg=70 cm than the head joints 12 of the ink ejection head 10.

The eight pressurization units 140 are disposed at substantially the same heights as the corresponding ink cartridges 111*a* to 111*h*. Moreover, the ink supply needle 121, the rubber stopper 112, the first ink supply channel 122, the second ink supply channel 123, and the check valves 125 and 126 are disposed at substantially the same height for each of the eight pressurization units 140. Furthermore, the second ink supply channel 123 and the third ink supply channel 124 communicate with each other through the check valve 126 at the height of the outlet port of the second ink supply channel 123. Hereinafter, the end of each ink supply channel 124 on the side to be connected to the ink cartridge 111, i.e., the end on the upstream side in the supply direction of the ink, will be referred to as "an inlet port". Also, the end of each ink supply channel 124 on the side to be connected to the head joint 12, i.e., the end on the downstream side in the supply direction of the ink, will be referred to as "an outlet port".

The relative height of the inlet ports with respect to the height of outlet ports is −40 cm for a pair of third ink supply channels 124 which are respectively joined to the head joints 12*a* and 12*b*. The relative height of the inlet ports with respect to the height of outlet ports is −50 cm for a pair of third ink supply channels 124 which are respectively joined to the head joints 12*c* and 12*d*. The relative height of the inlet ports with respect to the height of outlet ports is −60 cm for a pair of third ink supply channels 124 which are respectively joined to the head joints 12*e* and 12*f*. The relative height of the inlet ports with respect to the height of outlet ports is −70 cm for a pair of third ink supply channels 124 which are respectively joined to the head joints 12*g* and 12*h*. The heights of the outlet ports of the eight third ink supply channels 124 are identical to one another since the heights of the head joints 12*a* to 12*h* are the same.

The inks contained in the ink cartridges 111*a*, 111*b*, 111*c*, and 111*d* are sucked by the suction cap 20*a* through the nozzle arrays 9*a* to 9*d*. The inks contained in the ink cartridges 111*e*, 111*f*, 111*g*, and 111*h* are sucked by the suction cap 20*b* through the nozzle arrays 9*e* to 9*h*.

The ink contained in the ink cartridges 111*a* and 111*b* are black inks. The ink contained in the ink cartridge 111*c* is a cyan ink. The ink contained in the ink cartridge 111*d* is a light cyan ink. The ink contained in the ink cartridge 111*e* is a magenta ink. The ink contained in the ink cartridge 111*f* is a light magenta ink. The ink contained in the ink cartridge 111*g* is a yellow ink. The ink contained in the ink cartridge 111*h* is a clear ink, which is a ink containing no color material.

The viscosities of the black ink, the cyan ink, the light cyan ink, the magenta ink, the light magenta ink, and the yellow ink are 3.5 [mPa s], and the viscosity of the clear ink is 2.0 [mPa·s].

Figure 4:
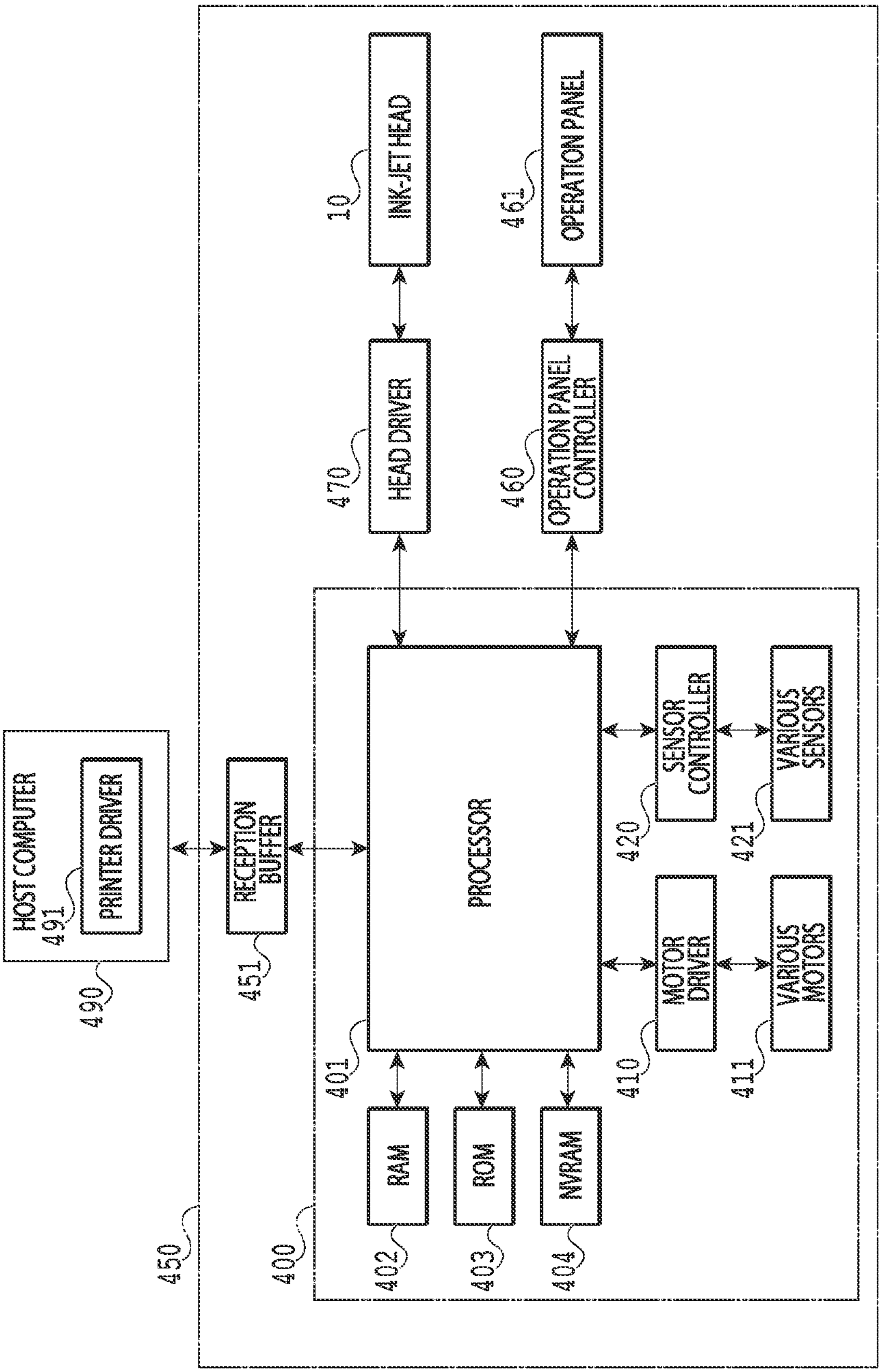
FIG. 4 is a functional block diagram of a control system of an ink-jet printer according to one or more aspects of the present disclosure.

Next, a control system of the ink-jet printer will be briefly described with reference to the block diagram illustrated in FIG. 4. In FIG. 4, reference 450 denotes the entire control system of the ink-jet printer. Reference 400 denotes an entire control system of the ink supply unit 100 in the present embodiment. Reference 490 denotes a host computer. The host computer 490 is connected to the ink-jet printer through a universal serial bus (USB) interface or the like, for example. Reference 491 denotes a printer driver stored in the host computer 490 in the form of software. In a case where the printer driver 491 is run by a processor (not illustrated) included in the host computer 490, the printer driver 491 generates print data from image data which a user desires, such as a document or a picture, and sends it to the ink-jet printer in response to a print instruction from the user.

In FIG. 4, reference 451 denotes a reception buffer that holds the print data and the like sent to the ink-jet printer from the host computer 490. The print data and the like held in the reception buffer 451 is transferred to a random-access memory (RAM) 402 and temporarily stored in the RAM 402 under control of a processor 401. Reference 403 denotes a read-only memory (ROM) storing a program, fixed data, and so on necessary for various types of control for the ink-jet printer. Reference 404 denotes a non-volatile random-access memory (NVRAM) storing information that should be kept stored in a case where the ink-jet printer is turned off as well as in a case where the ink-jet printer is turned on.

In FIG. 4, reference 410 denotes a motor driver that drives various motors 411 such as motors that drive the draw pumps 141 and the suction pump 22 and a motor that raises and lowers the suction cap 20. Reference 420 denotes a sensor controller that controls various sensors 421 such as a detection sensor including a photo-interrupter and other components.

Reference 460 denotes an operation panel controller that controls an operation panel 461 of the ink-jet printer. The operation panel 461 is capable of, for example, displaying the ink-jet printer's abnormality and the remaining amounts of the inks set in the ink-jet printer. A user can use the operation panel 461 to issue instructions to perform cleaning, attachment, and detachment of the ink ejection head 10. The operation panel 461 is attached to, for example, the front of the outer casing of the ink-jet printer so that a user can easily see and operate the operation panel 461.

Reference 470 denotes a head driver that drives the ink ejection head 10.

The processor 401 executes various processes such as calculation, control, determination, and setting with the RAM 402, the ROM 403, the NVRAM 404, and other components.

Figure 5:
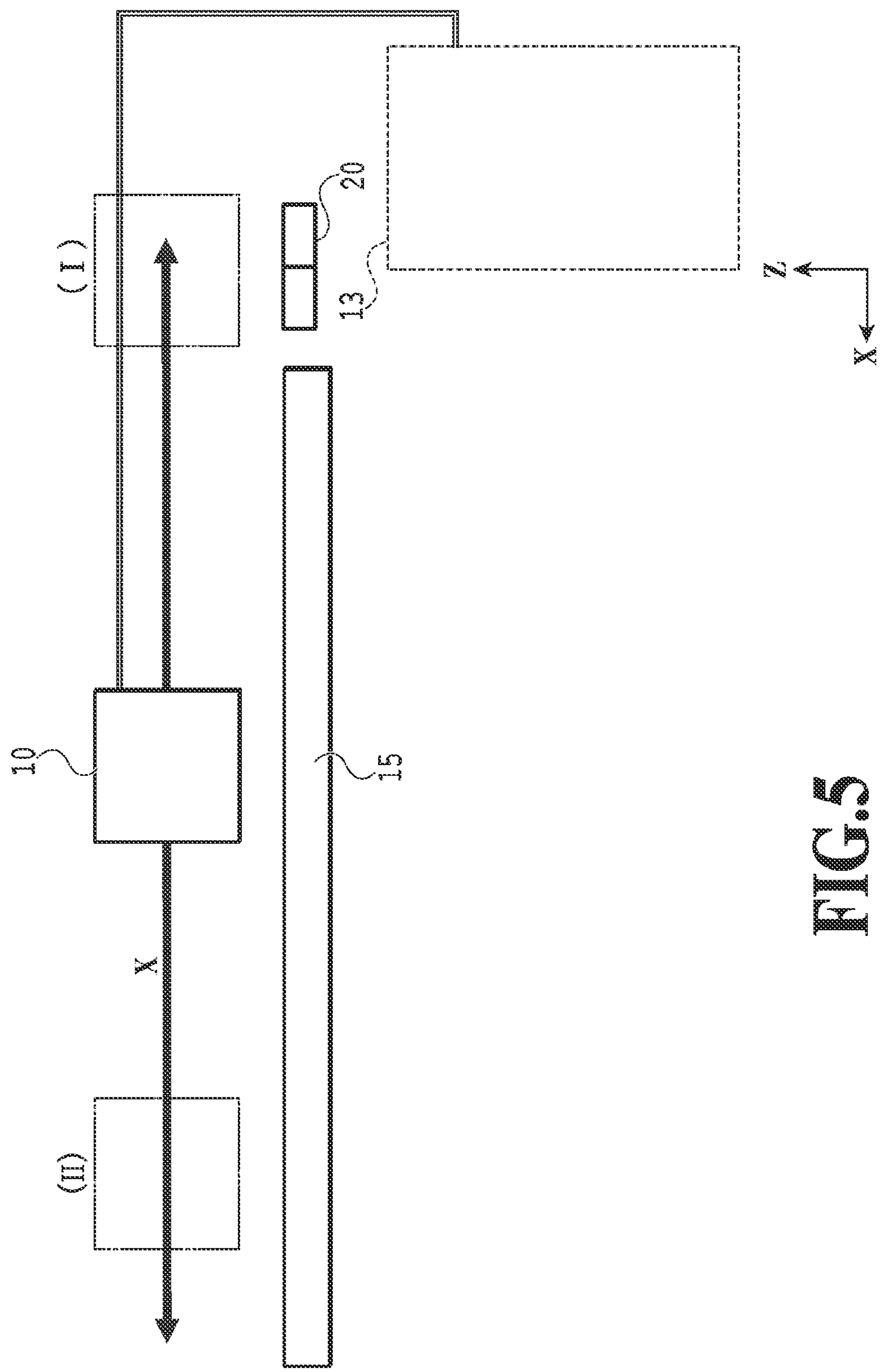
FIG. 5 is a schematic elevational view of a main part of an ink-jet printer according to one or more aspects of the present disclosure as seen from the front.

FIG. 5 is a schematic elevational view of a main part of the ink-jet printer in the present disclosure as seen from the front. The ink ejection head 10 is mounted on a carriage (not illustrated), which allows the ink ejection head 10 to move in the X direction (e.g., the width direction of the ink-jet printer). In a case where a print medium (not illustrated) is present on a platen 15, the ink ejection head 10 is moved in the X direction, and at the same time, the ink ejection head 10 is caused to eject inks to perform a printing operation on the print medium. In a case of performing a suction operation or an ejection operation for maintenance, the ink ejection head 10 is moved to the position indicated by (I) in FIG. 5. In a case of detaching the ink ejection head 10 from the ink-jet printer, the ink ejection head 10 is moved to the position indicated by (II). At the position indicated by (II), a cover on the outer casing (not illustrated) of the ink-jet printer can be opened, allowing the ink ejection head 10 to be detached from the ink-jet printer. The ink ejection head 10 can also be attached to the ink-jet printer at the position indicated by (II). The position indicated by (II) will be referred to as "a head replacing position".

As illustrated in FIG. 3, the third ink supply channels 124 of the ink-jet printer and the ink ejection head 10 are connected at the head joints 12. To detach the ink ejection head 10 from the ink-jet printer, a user operates a joint lever 14 illustrated in FIG. 3. This operation can collectively detach the multiple third ink supply channels 124 connected to the ink ejection head 10. A user can take the ink ejection head 10 out of the ink-jet printer by detaching the third ink supply channels 124 from the ink ejection head 10 and then lifting up the ink ejection head 10.

Now, a control method in head replacement of the ink-jet printer configured as above will be described with reference to the flowchart illustrated in FIG. 6.

In a case where the ink ejection head 10 fails to operate properly, in a case of performing manual cleaning, or in other similar cases, the ink ejection head 10 needs to be detached from the ink-jet printer. In such cases, a user chooses to detach the ink ejection head 10 on the operation panel 461 provided on the main body or on the host computer 490 connected to the ink-jet printer. In response to a user making such a choice, the processor 401 inputs a command to detach a liquid ejection head in step S601. In the following, "step S" will be denoted as "S".

Then, if determining in S602 that the ink-jet printer is performing a printing operation (YES), the processor 401 advances the processing to S603 to discontinue the printing operation and then stops the pressurizing operations of the pressurization units 140 in S606. The processor 401 executing S606 functions as a stopping unit.

If determining in step S602 that the ink-jet printer is not performing a printing operation (NO), the processor 401 advances the processing to S604 to check whether the ink-jet printer is performing a cleaning operation. If determining that the ink-jet printer is not performing a cleaning operation (NO), the processor 401 advances the processing to S606 to stop the pressurizing operations of the pressurization units 140.

If determining in S604 that the ink-jet printer is performing a cleaning operation (YES), the processor 401 advances the processing to S605 to wait until the cleaning operation ends. This is to avoid entry of dirty inks into the ink ejection head 10 from the ink ejection nozzle arrays 9a to 9h due to discontinuation of the cleaning operation. After the ink-jet printer finishes the cleaning operation, the processor 401 advances the processing to S606 to stop the pressurizing operations of the pressurization units 140.

After stopping the pressurizing operations of the pressurization units 140 in S606, the processor 401 advances the process to S607. In S607, in a case where the ink ejection head 10 is not present at a position indicated by (I) in FIG. 5 above the suction cap 20, the processor 401 moves the ink ejection head 10 to the position above the suction cap 20 and moves the suction cap 20 to the capping position.

Subsequently, in S608, the processor 401 causes the ink ejection head 10 to eject the inks to discharge the inks from the third ink supply channels 124. In this step, the processor 401 also actuates the suction pump 22. That is, the processor 401 let the suction pump 22 to discharge the inks, which has reached the suction cap 20 from the ink ejection head 10. The processor 401 executing S608 functions as a discharge unit.

Note that the processor 401 varies the amount of the ink to be ejected from the ink ejection head 10 in S608 for each ink ejection nozzle array. In the present embodiment, the amounts of the inks to be ejected from the ink ejection nozzle arrays 9a to 9h are set as listed in the table in FIG. 7. Details of this will be described later.

After finishing discharging the inks, the processor 401 advances the process to S609, and the processor 401 moves the ink ejection head 10 to the head replacing position indicated by (II) in FIG. 5. Then, in order to inform a user that the head is ready to be detached, the processor 401 displays that information on the operation panel 461 of the ink-jet printer using the operation panel controller 460. The processor 401 may let the host computer 490 to display that information.

This is a series of processes as a preparation for detaching the ink ejection head 10.

In a state where the ink ejection head 10 is mounted to the ink-jet printer, the third ink supply channel 124 and the head joint 12 communicate with each other. Therefore, the pressure of the ink at the outlet port of the third ink supply channel 124 is equal to the pressure of the ink in the head joints 12. Also, in each pressurization unit 140, the outlet port of the second ink supply channel 123 and the inlet port of the third ink supply channel 124 communicate with each other through the check valve 126. Therefore, the pressure of the ink at the outlet port of the second ink supply channel 123 is equal to the pressure of the ink at the inlet port of the third ink supply channel 124. Since the eight pressurization units 140 operate in similar manners, the pressures of the inks at the inlet ports of the third ink supply channels 124 in the eight pressurization units 140 are always equal to one another. Moreover, the pressure of the ink at the outlet port of each third ink supply channel 124 differs from the pressure of the ink at the inlet port of the third ink supply channel 124 according to the height difference between the inlet port and the outlet port. In a case where the inlet port of the third ink supply channel 124 is lower than the outlet port of the third ink supply channel 124, the pressure of the ink at the outlet port of the third ink supply channel 124 is lower than the pressure of the ink at the inlet port according to that height difference.

As illustrated in FIG. 3, height differences are in relation of $Za<Zc<Ze<Zg$. The height difference Za corresponds to the height difference between the ink cartridges 111a and 111b and the head joints 12. The height difference Zc corresponds to the height difference between the ink cartridges 111c and 111d and the head joints 12. The height difference Ze corresponds to the height difference between the ink cartridges 111e and 111f and the head joints 12. The height difference Zg corresponds to the height difference between the ink cartridges 111g and 111h and the head joints 12.

Thus, in a state where the ink ejection head is mounted to the ink-jet printer, the pressure of the ink at the outlet port of each third ink supply channel 124 and the pressure of the ink in each head joint 12 vary depending on the corresponding ink cartridge 111. Specifically, the above-mentioned pressures corresponding to the ink cartridges 111c and 111d are higher than the above-mentioned pressures corresponding to the ink cartridges 111a and 111b. Likewise, the above-mentioned pressures corresponding to the ink cartridges 111e and 111f are higher than the above-mentioned pressures corresponding to the ink cartridges 111c and 111d. The above-mentioned pressures corresponding to the ink cartridges 111g and 111h are higher than the above-mentioned pressures corresponding to the ink cartridges 111e and 111f.

In the ink-jet printer in the present embodiment, the pressures of the inks at the outlet ports of the third ink supply channels 124 (gauge pressures) and the pressures of the inks in the head joints 12 before pressurization by the pressurization units 140 are as follows. In the following, the term "pressure" means a gauge pressure.

<Pressures Before Pressurization>

System a: approximately −2.2 kPa
System b: approximately −2.2 kPa
System c: approximately −2.4 kPa
System d: approximately −2.4 kPa
System e: approximately −2.6 kPa
System f: approximately −2.6 kPa
System g: approximately −2.8 kPa
System h: approximately −2.8 kPa Here, a system i (i=a, b, . . . , h) is a system including an ink ejection nozzle array 9i, an ink cartridge 111i, and a head joint 12i.

Pressurization by the pressurization units 140 raises the pressures of the inks in the respective systems by the same amount.

In the ink-jet printer in the present embodiment, the pressures of the inks at the outlet ports of the third ink supply channels 124 and the pressures of the inks in the head joints 12 after pressurization by the pressurization units 140 are as follows.

<Pressures after Pressurization>

System a: approximately 29.8 kPa
System b: approximately 29.8 kPa
System c: approximately 29.6 kPa
System d: approximately 29.6 kPa
System e: approximately 29.4 kPa System f: approximately 29.4 kPa
System g: approximately 29.2 kPa
System h: approximately 29.2 kPa As described above, even after pressurization, the pressure differences corresponding to the water head differences originating from the heights of the ink cartridges 111 before the pressurization are maintained among systems.

The pressurizing operations of the pressurization units 140 are stopped in S606, which is a preparation for detaching the ink ejection head 10, while the above state is maintained. The pressures of the inks at the outlet ports of the third ink supply channels 124 and the pressures of the inks in the head joints 12 are maintained as they are even after the pressurizing operations of the pressurization units 140 are stopped. If the ink ejection head 10 is detached in this state, the pressurized inks inside the third ink supply channels 124 and the head joints 12*a* to 12*h* will leak out. The ink leakage can be prevented by lowering the pressures of the inks at the outlet ports of the third ink supply channels 124 and in the head joints 12 to zero or less. In order to lower the ink pressures, it is necessary to reduce the amounts of the inks inside the third ink supply channels 124 and the head joints 12*a* to 12*h*. However, the check valves 126, which are present on the ink cartridges 111*a* to 111*h* side, prevent the inks from flowing to the ink cartridges 111. Then, it is conceivable to cause the inks inside the third ink supply channels 124 and the head joints 12*a* to 12*h* to flow out into the ink ejection head 10 so that the ink pressures can be reduced. In the present embodiment, the inks are ejected from the nozzle arrays 9 of the ink ejection head 10 in S608 (FIG. 6) to cause the inks inside the third ink supply channels 124 and the head joints 12*a* to 12*h* to flow out into the ink ejection head 10.

By ejecting the inks into the suction cap 20 from the ink ejection head 10 in step S608, the inks inside the ink ejection head 10 are consumed, thereby enhancing the negative pressures inside the ink ejection head 10. This causes the negative pressure regulators 11 to open, so that the inks flow into the ink ejection head 10 from the third ink supply channels 124 through the head joints 12*a* to 12*h*. Since the inks flow out into the ink ejection head 10 as described above, the pressures of the inks inside the third ink supply channels 124 and the head joints 12*a* to 12*h* drop. In the present embodiment, the inks are ejected in the amounts listed in the table of FIG. 7 from the ink ejection nozzle arrays 9*a* to 9*h* of the ink ejection head 10. As a result, the pressures of the inks at the outlet ports of the third ink supply channels 124 and the pressures of the inks in the head joints 12 have the following values after the ink discharge.

<Pressures after Ink Discharge>

System a: approximately 0.0 kPa
System b: approximately 0.0 kPa
System c: approximately 0.0 kPa
System d: approximately 0.0 kPa
System e: approximately 0.0 kPa
System f: approximately 0.0 kPa
System g: approximately 0.0 kPa
System h: approximately −0.2 kPa The pressurization units 140 have been stopped since S606, and the pressures after the ink discharge at S608 are greater than the above-mentioned pressures before the pressurization. Hence, the inks do not flow into the third ink supply channels 124 from the ink cartridges 111*a* to 111*h*.

Also, the negative pressure regulators 11 are configured to regulate the negative pressures inside the ink ejection head 10 to −0.5 kPa. The pressures of the inks at the outlet ports of the third ink supply channels 124 after the ink discharge are 0.0 kPa or −0.2 kPa, which is higher than −0.5 kPa. Hence, backflows of the inks into the third ink supply channels 124 from the ink ejection head 10 will be avoided even if an on-off valves of the negative pressure regulators 11 open due to enhancement of the negative pressures, that is, decrease of the gauge pressures, inside the ink ejection head 10. Entry of air into the third ink supply channels 124 from the ink ejection head 10 also will be avoided even if an on-off valves of the negative pressure regulators 11 open due to the same reason.

To summarize the above numbers, as for the systems a and b, the pressures after pressurization are approximately 29.8 kPa, the pressures after the ink discharge are approximately 0.0 kPa, and the number of ejected dots is 60000 dots. As for the systems c and d, the pressures after pressurization are approximately 29.6 kPa, the pressures after the ink discharge are approximately 0.0 kPa, and the number of ejected dots is 50000 dots. As for the systems e and f, the pressures after pressurization are approximately 29.4 kPa, the pressures after the ink discharge are approximately 0.0 kPa, and the number of ejected dots is 40000 dots. As for the system g, the pressure after pressurization is approximately 29.2 kPa, the pressure after the ink discharge is approximately 0.0 kPa, and the number of ejected dots is 30000 dots. As for the system h, the pressure after pressurization is approximately 29.2 kPa, the pressure after the ink discharge is approximately −0.2 kPa, and the number of ejected dots is 40000 dots.

This indicates that the lower the height of the inlet port of a third ink supply channel 124 relative to the height of the outlet port of the third ink supply channel 124, the smaller the difference between the pressure after pressurization and the pressure after the ink discharge, and accordingly, the less the number of dots to be discharged. That is, the lower the relative height of the inlet port of a third ink supply channel 124 with respect to the height of the outlet port of the third ink supply channel 124, the smaller the difference between the pressure after pressurization and the pressure after the ink discharge. Thus, it is understood that the lower the relative height, the smaller the amount of the ink to be ejected from the ink ejection nozzle array 9, and at the same time, the smaller the amount of the ink discharged from the third ink supply channel 124.

The pressures after the ink discharge in the systems a to g are approximately 0.0 kPa while the pressure after the ink discharge in the system h is approximately −0.2 kPa. This is because the viscosities of the inks in the systems a to g are 3.5 [mPa's] while the viscosity of the ink in the system h is 2.0 [mPa·s]. Specifically, as for the system h, the ink has low viscosity and is easy to leak. Therefore, the pressure of the ink after ink discharge is set to a negative pressure in order to prevent leakage of the ink from the outlet port of the third ink supply channel 124 or from the head joint 12*h* due to insufficient viscosity.

As described above, according to the first embodiment, the ink ejection head 10 can be detached in an appropriate state according to the heights at which the ink cartridges 111*a* to 111*h* are installed and the values of physical properties of the inks. This prevents leakage of the inks.

Second Embodiment

Next, an ink-jet printer in a second embodiment of the present disclosure will be described with reference to drawings. The second embodiment employs the configurations in FIGS. 1 to 4 in the first embodiment, and description referring to these drawings is omitted.

A mini-suction cap 24 in the present embodiment will be described with reference to FIGS. 8A and 8B. Like the suction cap 20, the mini-suction cap 24 is capable of covering the ink ejection nozzle arrays 9*a* to 9*h* and sucking the inks out of the ink ejection nozzle arrays 9*a* to 9*h* with the suction pump 22 connected to the mini-suction cap 24. Here, the mini-suction cap 24 covers a smaller area. That is, the mini-suction cap 24 has such a width as to only cover the ink ejection nozzle array 9*i* (i=a to h) individually, and has a short length in the array direction. By moving the mini-suction cap 24 in the nozzle array direction as indicated by an arrow M in FIG. 8A while driving the suction pump 22, an ink inside the ink ejection head 10 can be discharged from each ink ejection nozzle array 9*i*. In the example illustrated in FIGS. 8A and 8B, the mini-suction cap 24 sucks an ink out of the ink ejection nozzle array 9*a*. In a case of sucking other ink from other ink ejection nozzle array 9*i* (i=b to h), the ink ejection head 10 is moved in the X direction to set the mini-suction cap 24 at the position of the ink ejection nozzle array 9*i* (i=b to h) from which the mini-suction cap 24 sucks out an ink.

Figure 6:
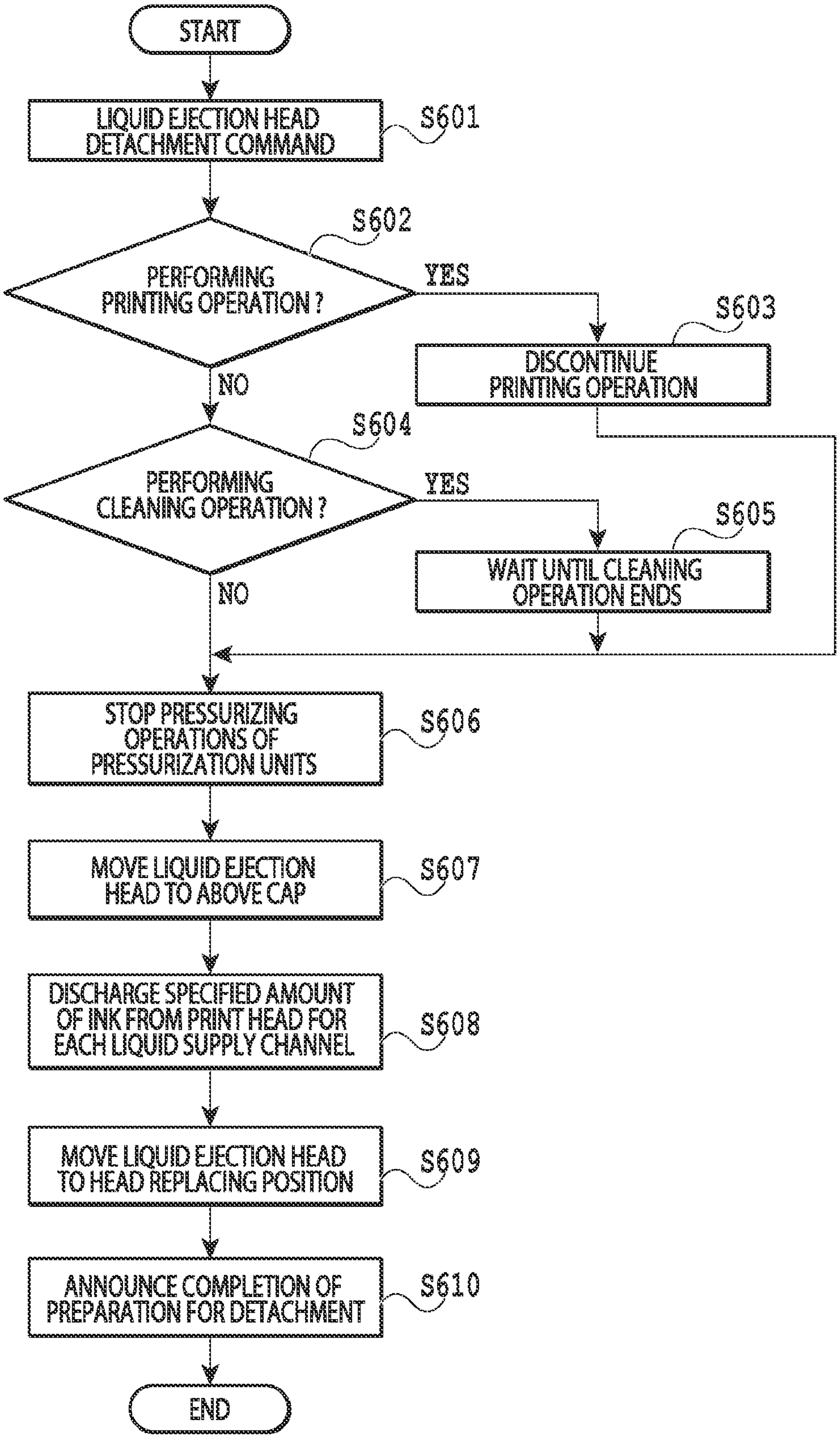
FIG. 6 is a flowchart illustrating processing as a preparation for detaching a head according to one or more aspects of the present disclosure.

In the present embodiment, a preparation process for detaching the ink ejection head 10 is as illustrated in FIG. 6, as in the first embodiment.

In the first embodiment, the suction cap 20 collectively corresponds to the ink ejection nozzle arrays 9*a* to 9*h*. For this reason, adjusting the amount of ink sucked by the suction cap 20 does not make it possible to adjust amount of ink to be sucked from each ink discharge nozzle row 9*i* (i=a to h). Therefore, in the first embodiment, the ink ejection head 10 is driven in such a way to adjust the amount of the ink to be ejected from each ink ejection nozzle array 9*i* (i=a to h). In the present embodiment, on the other hand, the mini-suction cap 24 is capable of adjusting the amount of the ink to be sucked out of each ink ejection nozzle array 9*i* (I=a to h). This makes it possible to individually adjust the amount of the ink to be discharged from the ink ejection nozzle array 9 in each system and therefore, to individually adjust the amount of the ink to be discharged from the third ink supply channel 124 in each system.

By adjusting the speed at which the mini-suction cap 24 is scanned over the ink ejection nozzle array 9*i* (i=a to h), it is possible to adjust the amount of the ink to be sucked out of the ink ejection nozzle array 9*i* (i=a to h) by the mini-suction cap 24. In this case, there is no need to change the amount of the ink to be sucked out by the mini-suction cap 24 per unit time.

Figure 8A:
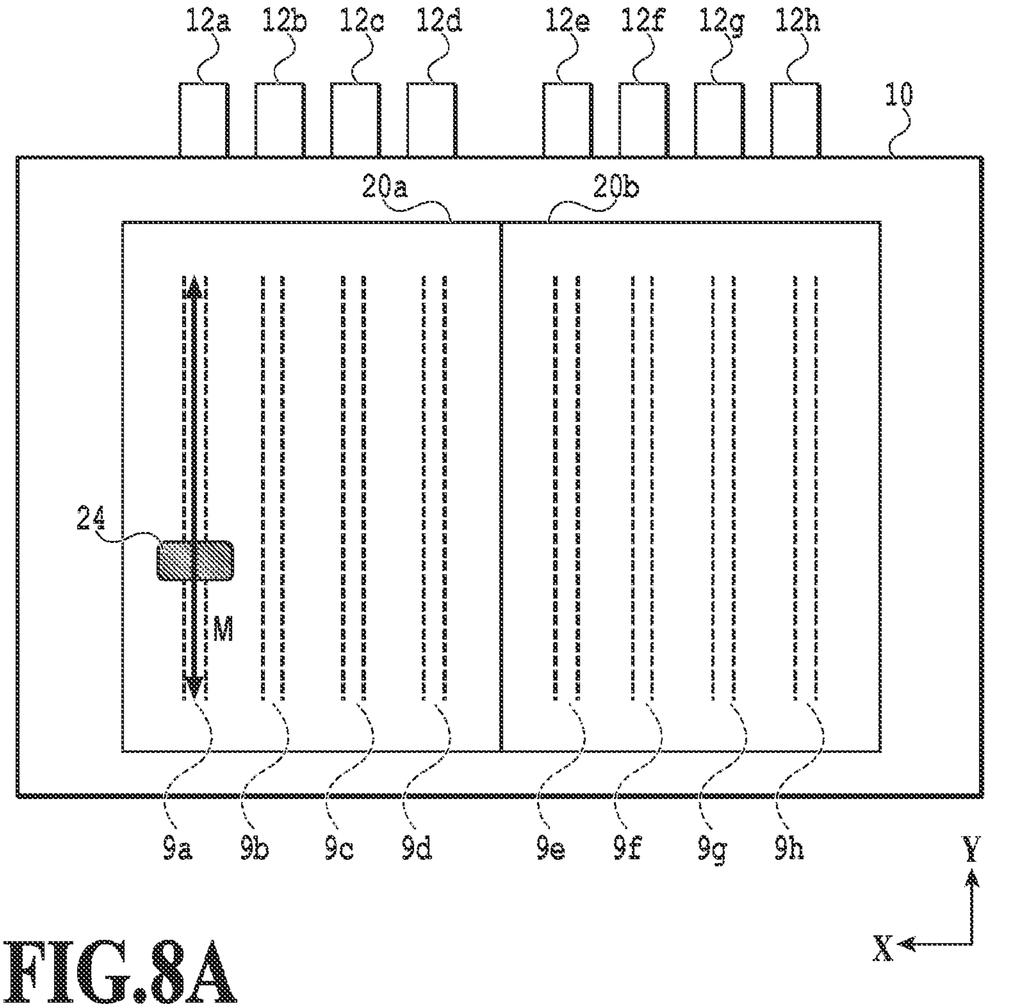
FIG. 8A is a schematic view illustrating a capping area and scanning direction of a mini-suction cap in a second embodiment.
Figure 8B:
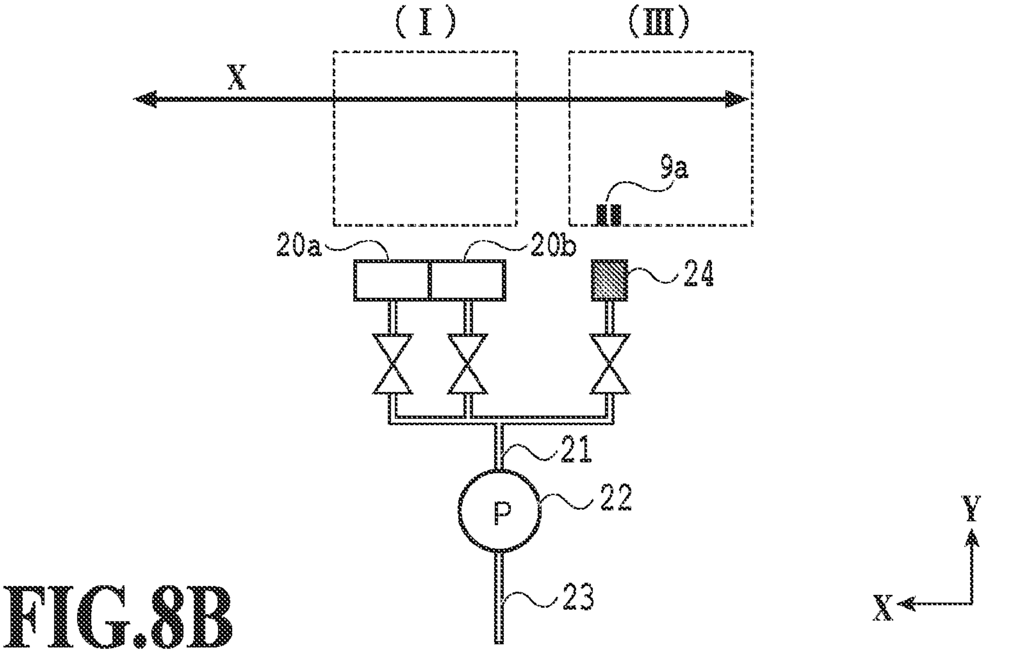
FIG. 8B is a schematic elevational view illustrating a positional relationship between the suction cap and the mini-suction cap according to one or more aspects of the present disclosure.

The following is a list of the moving speeds of the mini-suction cap 24 in the nozzle array direction in FIG. 8A (M direction) in a case of performing suction from the ink ejection nozzle arrays 9*a* to 9*h*.

System a: 2.0 mm/s (approximately 1.23 ml)
System b: 2.0 mm/s (approximately 1.23 ml)
System c: 2.4 mm/s (approximately 1.02 ml)
System d: 2.4 mm/s (approximately 1.02 ml)
System e: 3.0 mm/s (approximately 0.82 ml)
System f: 3.0 mm/s (approximately 0.82 ml)
System g: 4.0 mm/s (approximately 0.61 ml)
System h: 3.0 mm/s (approximately 0.82 ml)

The slower the movement, the longer the duration of the suction operation, and the larger the amount of the ink to be sucked out.

As described above, according to the present embodiment, as in the first embodiment, the ink ejection head 10 can be detached in an appropriate state according to the heights at which the ink cartridges 111*a* to 111*d* are installed and the values of physical properties of the inks. This prevents leakage of the inks.

Also, according to the present embodiment, as in the first embodiment, the pressurization in each ink channel can be released according to the pressure therein. This prevents backflow of the ink from the nozzle array and entry of air.

Other Embodiments

In a case where the amounts of the inks that need to be discharged is large, a suction operation with the suction cap 20 may be used in combination with the first embodiment or the second embodiment.

In a case of combining the first embodiment and a suction operation with the suction cap, for example, the suction cap 20 is caused to suck out an amount of each ink equivalent to 2000 dots in terms of the number of dots to be ejected. Then, each of the ink ejection nozzle arrays 9*a* to 9*h* is caused to eject an amount of the ink equivalent to a number of dots derived by subtracting 2000 dots from the corresponding number of dots to be ejected listed in the table of FIG. 7 as described in the first embodiment.

In a case of combining the second embodiment and suction operations with the suction caps, for example, the suction cap 20, functioning as a main suction cap, is caused to suck out 0.4 ml of each ink. Then, for example, for the system a, the mini-suction cap 24 is caused to suck an amount of the corresponding ink derived by subtracting 0.4 ml from 2.0 ml out of the ink ejection nozzle array 9*a* as described in the second embodiment.

The pressurization units 140 prepare pressurized inks in the internal ink chambers 130, but may directly pressurize the inks contained in the ink cartridges 111, for example, by deforming the ink cartridges 111.

In the above embodiments, the liquid ejection apparatus has been exemplarily described by taking an ink-jet printer which ejects inks as an example. The above embodiments are also applicable to liquid ejection apparatuses which eject liquids other than inks.

According to the present disclosure, for each ink reservoir unit, an amount of the ink required to remove the pressure can be discharged. Thus, the pressures inside of the ink supply channels and the print head can be set to appropriate pressures before detachment of the print head. It is therefore possible to prevent leakage of the inks at the time of detachment of the print head, backflow of the inks, entry of air, and color mixture, and avoid using a long time and large amounts of the inks for the recovery of the print head after detachment and attachment of the print head.

Each of the above embodiments can be implemented also by executing the following process. Specifically, the process involves providing software (program) that implements the functions of the embodiment to a system or an apparatus via a network or any of various storage media, and causing a computer (such as a processor or a microprocessor unit (MPU) of the system or the apparatus to read out and execute the program. The program may be executed by a single computer or by multiple computers cooperating with each other. It is not necessary to implement all of the processes described above with the software. Some or all of the processes may be implemented by hardware, such as an application-specific integrated circuit (ASIC). As for the processor too, not all of the processes have to be performed by a single processor. Multiple processors may cooperate with each other as appropriate to perform the processes. The implementation of the functions of the above embodiments is not limited only a case where the computer executes program code that is read out. The functions of the above embodiments may be implemented by some or all of actual processes performed by the operating system (OS) running on the computer based on instructions in the program code.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-203178, filed on Dec. 20, 2022, which is hereby incorporated by reference wherein in its entirety.

What is claimed is:

1. A liquid ejection apparatus comprising:

a liquid ejection head having a first nozzle array that ejects first liquid supplied from a first liquid containing unit and a second nozzle array that ejects second liquid supplied from a second liquid containing unit;

a first liquid supply channel which supplies the first liquid inside the first liquid containing unit to the liquid ejection head;

a second liquid supply channel which supplies the second liquid inside the second liquid containing unit to the liquid ejection head;

a first pressurization unit which pumps the first liquid to the liquid ejection head through the first liquid supply channel;

a second pressurization unit which pumps the second liquid to the liquid ejection head through the second liquid supply channel; and a control unit configured, in a case of preparing to detach the liquid ejection head from a mounting portion of the apparatus, to control the first pressurization unit and the second pressurization unit to stop pumping the first liquid and the second liquid, respectively, and to control the liquid ejection head to perform a liquid discharge operation of discharging the first liquid and the second liquid from the first nozzle array and the second nozzle array, respectively, while controlling amounts of the first liquid and the second liquid discharged from the first nozzle array and the second nozzle array, respectively, in the liquid discharge operation.

2. The liquid ejection apparatus according to claim 1, wherein the first liquid supply channel has a first end on an upstream side in a supply direction of the first liquid and a second end on a downstream side in the supply direction of the first liquid, and the second liquid supply channel has a third end on an upstream side in a supply direction of the second liquid and a fourth end on a downstream side in the supply direction of the second liquid.

3. The liquid ejection apparatus according to claim 2, wherein the amount of the first liquid discharged from the first nozzle array in the liquid discharge operation is an amount adjusted in advance according to a relative height of the first end as compared to the second end, and the amount of the second liquid discharged from the second nozzle array in the liquid discharge operation is an amount adjusted in advance according to a relative height of the third end as compared to the fourth end.

4. The liquid ejection apparatus according to claim 3, wherein each of the adjusted amounts is adjusted such that the lower the corresponding relative height, the smaller the adjusted amount.

5. The liquid ejection apparatus according to claim 3, wherein each of the adjusted amounts is further adjusted in advance according to viscosity of the corresponding liquid.

6. The liquid ejection apparatus according to claim 5, wherein each of the adjusted amounts is adjusted such that the lower the viscosity of the corresponding liquid, the larger the adjusted amount.

7. The liquid ejection apparatus according to claim 2, wherein a height at which the second end of the first liquid supply channel is positioned and a height at which the fourth end of the second liquid supply channel is positioned are same to each other, and a height at which the first end of the first liquid supply channel is positioned and a height at which the third end of the second liquid supply channel is positioned are different from each other.

8. The liquid ejection apparatus according to claim 1, further comprising:

a first suction unit which sucks the first liquid out of the first nozzle array; and a second suction unit which sucks the second liquid out of the second nozzle array, wherein in the liquid discharge operation, the control unit controls the amounts of the first liquid and the second liquid discharged from the first nozzle array and the second nozzle array by controlling amounts of the first liquid and the second liquid sucked out by the first suction unit and the second suction unit, respectively.

9. The liquid ejection apparatus according to claim 8, wherein the first suction unit sucks out the first liquid while moving in an array direction of the first nozzle array, and the second suction unit sucks out the second liquid while moving in an array direction of the second nozzle array.

10. The liquid ejection apparatus according to claim 9, wherein the control unit controls the amounts of the first liquid and the second liquid discharged from the first nozzle array and the second nozzle array, respectively, by making moving speeds of the first suction unit and the second suction unit different from each other.

11. The liquid ejection apparatus according to claim 1, further comprising:

a suction unit which sucks the first liquid out of the first nozzle array and the second liquid out of the second nozzle array, wherein in the liquid discharge operation, the control unit controls the amounts of the first liquid and the second liquid discharged from the first nozzle array and the second nozzle array by controlling amounts of the first liquid and the second liquid sucked out by the suction unit, respectively.

12. The liquid ejection apparatus according to claim 11, wherein the suction unit sucks out the first liquid while moving along the first nozzle array, and the second liquid while moving along the second nozzle array.

13. The liquid ejection apparatus according to claim 12, wherein the control unit controls the amounts of the first liquid and the second liquid discharged from the first nozzle array and the second nozzle array, respectively, by making moving speed of the suction unit when moving along the first nozzle array and moving speed of the suction unit moving along the second nozzle array different from each other.

14. The liquid ejection apparatus according to claim 1, wherein the amount of the first liquid discharged from the first nozzle array in the liquid discharge operation is an amount adjusted in advance according to viscosity of the first liquid, and the amount of the second liquid discharged from the second nozzle array in the liquid discharge operation is an amount adjusted in advance according to viscosity of the second liquid.

15. The liquid ejection apparatus according to claim 14, wherein the adjusted amounts are each an amount adjusted such that the lower the viscosity of the corresponding liquid, the larger the amount.

16. A control method for controlling a liquid ejection apparatus, wherein the liquid injection apparatus includes:

a liquid ejection head having a first nozzle array that ejects first liquid supplied from a first liquid containing unit and a second nozzle array that ejects second liquid supplied from a second liquid containing unit;

a first liquid supply channel which supplies the first liquid inside the first liquid containing unit to the liquid ejection head;

a second liquid supply channel which supplies the second liquid inside the second liquid containing unit to the liquid ejection head;

a first pressurization unit which pumps the first liquid to the liquid ejection head through the first liquid supply channel; and a second pressurization unit which pumps the second liquid to the liquid ejection head through the second liquid supply channel, the control method comprising:

in a case of preparing to detach the liquid ejection head from a mounting portion of the apparatus, controlling the first pressurization unit and the second pressurization unit to stop pumping the first liquid and the second liquid, respectively, and to controlling the liquid ejection head to perform a liquid discharge operation of discharging the first liquid and the second liquid from the first nozzle array and the second nozzle array, respectively; and controlling amounts of the first liquid and the second liquid discharged from the first nozzle array and the second nozzle array, respectively, in the liquid discharge operation.

17. A non-transitory computer readable medium storing instruction when executed, causing a liquid ejection apparatus to execute a control method, wherein the liquid ejection apparatus includes:

a liquid ejection head having a first nozzle array that ejects first liquid supplied from a first liquid containing unit and a second nozzle array that ejects second liquid supplied from a second liquid containing unit;

a first liquid supply channel which supplies the first liquid inside the first liquid containing unit to the liquid ejection head;

a second liquid supply channel which supplies the second liquid inside the second liquid containing unit to the liquid ejection head;

a first pressurization unit which pumps the first liquid to the liquid ejection head through the first liquid supply channel; and a second pressurization unit which pumps the second liquid to the liquid ejection head through the second liquid supply channel, the control method comprising:

in a case of preparing to detach the liquid ejection head from a mounting portion of the apparatus, controlling the first pressurization unit and the second pressurization unit to stop pumping the first liquid and the second liquid, respectively, and to controlling the liquid ejection head to perform a liquid discharge operation of discharging the first liquid and the second liquid from the first nozzle array and the second nozzle array, respectively; and controlling amounts of the first liquid and the second liquid discharged from the first nozzle array and the second nozzle array, respectively, in the liquid discharge operation.

* * * * *